(12) United States Patent
Gonzalez et al.

(10) Patent No.: US 10,308,192 B2
(45) Date of Patent: Jun. 4, 2019

(54) SEATING ASSEMBLY TO SUPPORT A MOBILE COMPUTING DEVICE AND METHOD OF SUPPORTING THE MOBILE COMPUTING DEVICE WITH THE SEATING ASSEMBLY

(71) Applicant: Ford Global Technologies, LLC, Dearborn, MI (US)

(72) Inventors: Enrique Gonzalez, Moroleon (MX); Jose Ricardo Trolle Lara, Mexico City (MX); Adrian Romero Regalado, Cuautitlan Izcalli (MX)

(73) Assignee: Ford Global Technologies, LLC, Dearborn, MI (US)

( * ) Notice: Subject to any disclaimer, the term of this patent is extended or adjusted under 35 U.S.C. 154(b) by 27 days.

(21) Appl. No.: 15/680,263

(22) Filed: Aug. 18, 2017

(65) Prior Publication Data
US 2019/0054864 A1 Feb. 21, 2019

(51) Int. Cl.
*B60R 11/02* (2006.01)
*B60N 2/64* (2006.01)
*B60N 2/809* (2018.01)
*B60R 11/00* (2006.01)

(52) U.S. Cl.
CPC ............ *B60R 11/0252* (2013.01); *B60N 2/64* (2013.01); *B60N 2/809* (2018.02); *B60R 2011/0017* (2013.01)

(58) Field of Classification Search
CPC ............ B60R 11/0252; B60R 11/0235; B60R 2011/0276; B60R 2011/0017; B60N 2/809; B60N 2/64; B60N 2002/899; B60N 2/879
See application file for complete search history.

(56) References Cited

U.S. PATENT DOCUMENTS

| 6,698,832 | B2 * | 3/2004 | Boudinot | ............ | B60R 11/0235 |
| | | | | | 297/217.4 |
| 7,364,230 | B2 | 4/2008 | Zheng | | |
| 8,109,569 | B2 | 2/2012 | Mitchell | | |
| 8,136,777 | B2 * | 3/2012 | Brawner | ............ | B60R 11/0235 |
| | | | | | 248/118 |

(Continued)

FOREIGN PATENT DOCUMENTS

EP 1517811 A1 3/2005

*Primary Examiner* — Philip F Gabler
(74) *Attorney, Agent, or Firm* — Vichit Chea; Price Heneveld LLP

(57) ABSTRACT

A method of supporting a mobile computing device in a vehicle comprising: providing a seating assembly disposed in an interior of a vehicle, the seating assembly comprising a seatback and a headrest adjustably coupled to the seatback; placing a mobile computing device between the seatback and the headrest; and adjusting the headrest relative to the seatback such that the seatback and the headrest support the mobile computing device. The seatback can further comprise a first lower support member including an upward extension, wherein, placing a mobile computing device between the seatback and the headrest includes placing the mobile computing device adjacent and forward the upward extension of the first lower support member; and wherein, the upward extension of the first lower support member further supports the mobile computing device. The method can further comprise connecting the mobile computing device to a connection port on the seating assembly.

10 Claims, 16 Drawing Sheets

(56) References Cited

U.S. PATENT DOCUMENTS

| | | |
|---|---|---|
| 8,794,700 B2 | 8/2014 | Brawner |
| 9,421,892 B1 | 8/2016 | Abro et al. |
| 9,446,719 B2 | 9/2016 | Lee et al. |
| 9,457,731 B2 * | 10/2016 | Narayanan .............. B60R 11/02 |
| 9,925,898 B2 * | 3/2018 | Shin .................... B60R 11/0235 |
| 2005/0011920 A1 | 1/2005 | Feng |
| 2008/0315640 A1 * | 12/2008 | Bargheer ................. B60J 7/223 |
| | | 297/220 |
| 2012/0018471 A1 * | 1/2012 | Guillermo ........... B60R 11/0235 |
| | | 224/275 |
| 2017/0197528 A1 * | 7/2017 | Navarro ............. B60R 11/0252 |
| 2018/0222400 A1 * | 8/2018 | Neumann ............... B60R 11/02 |

* cited by examiner

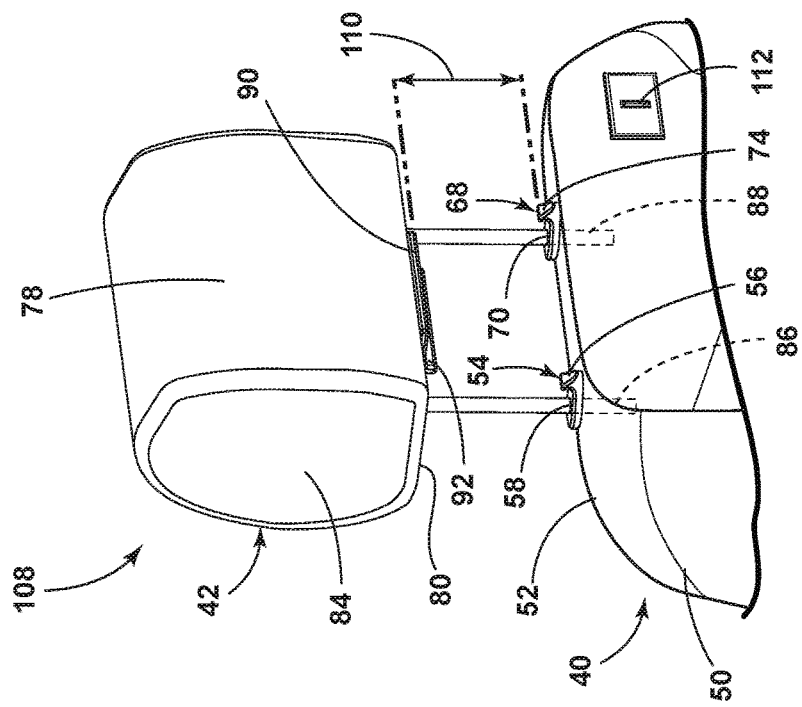
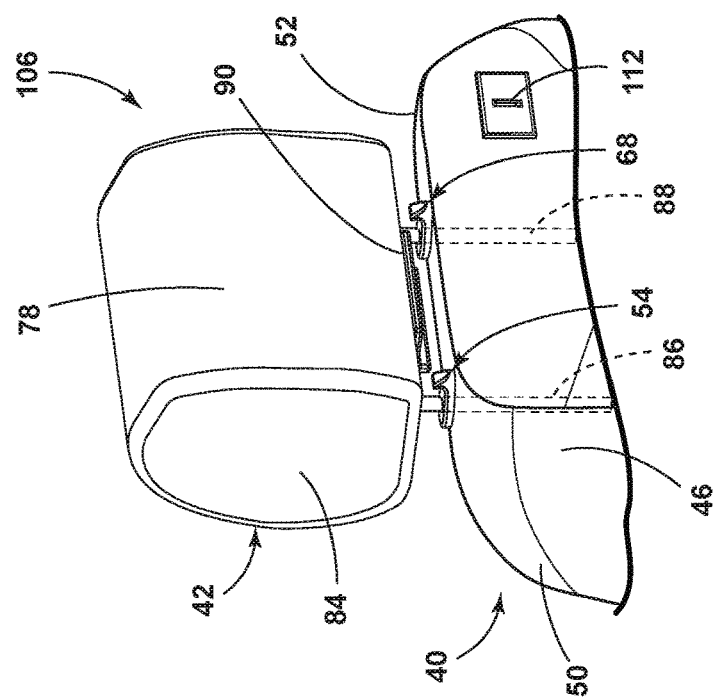

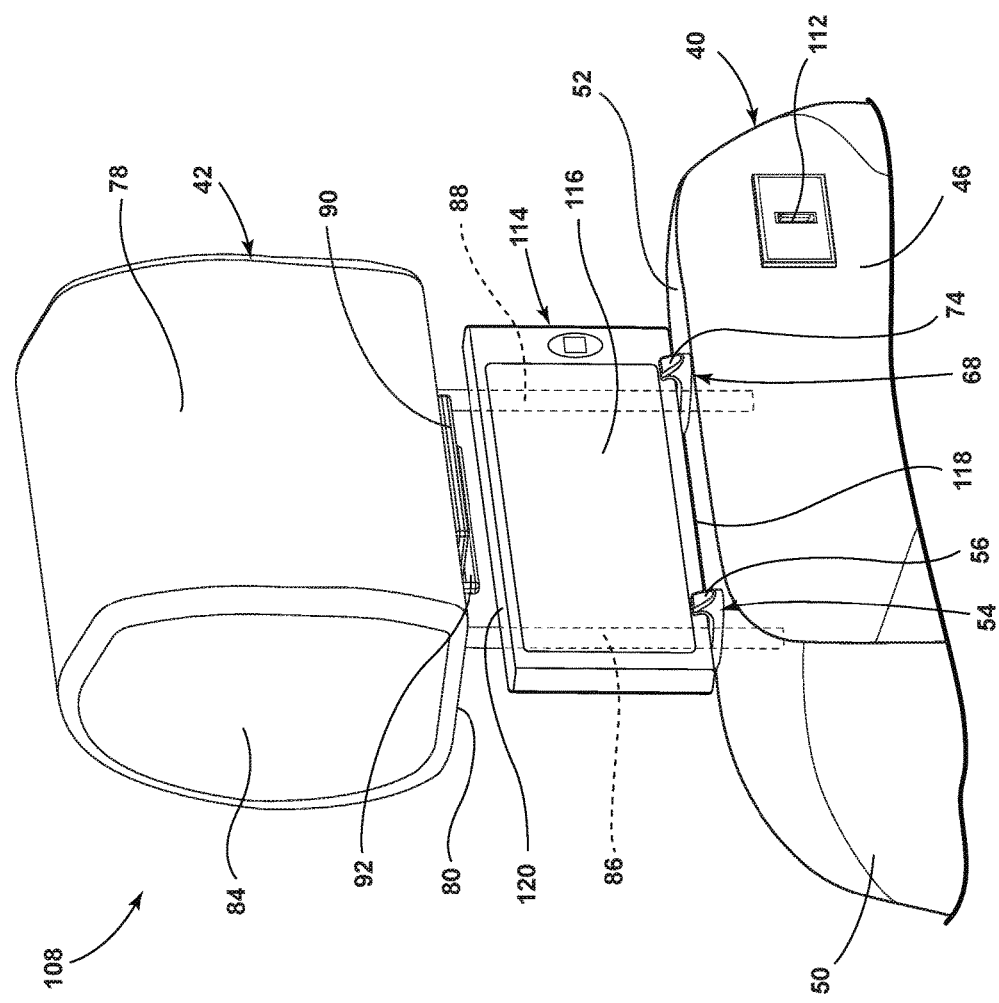

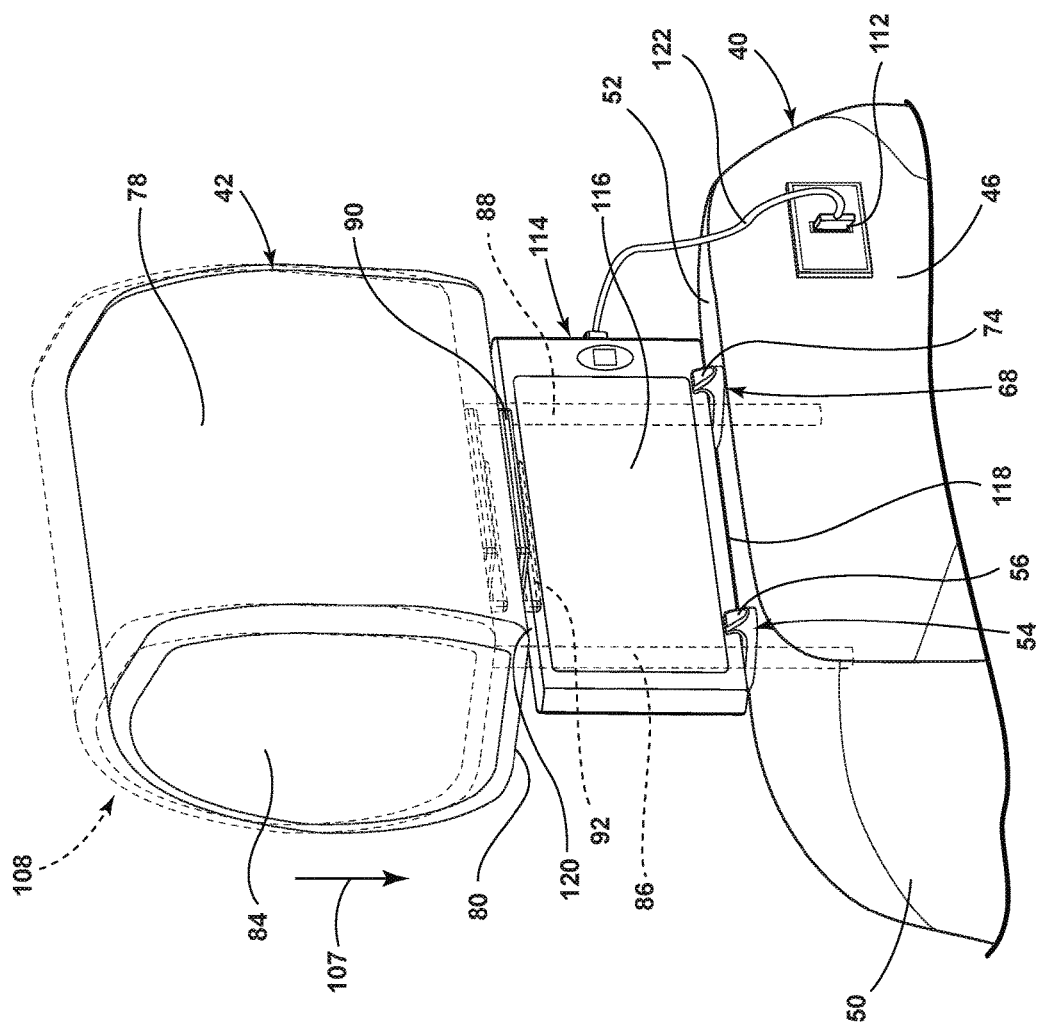

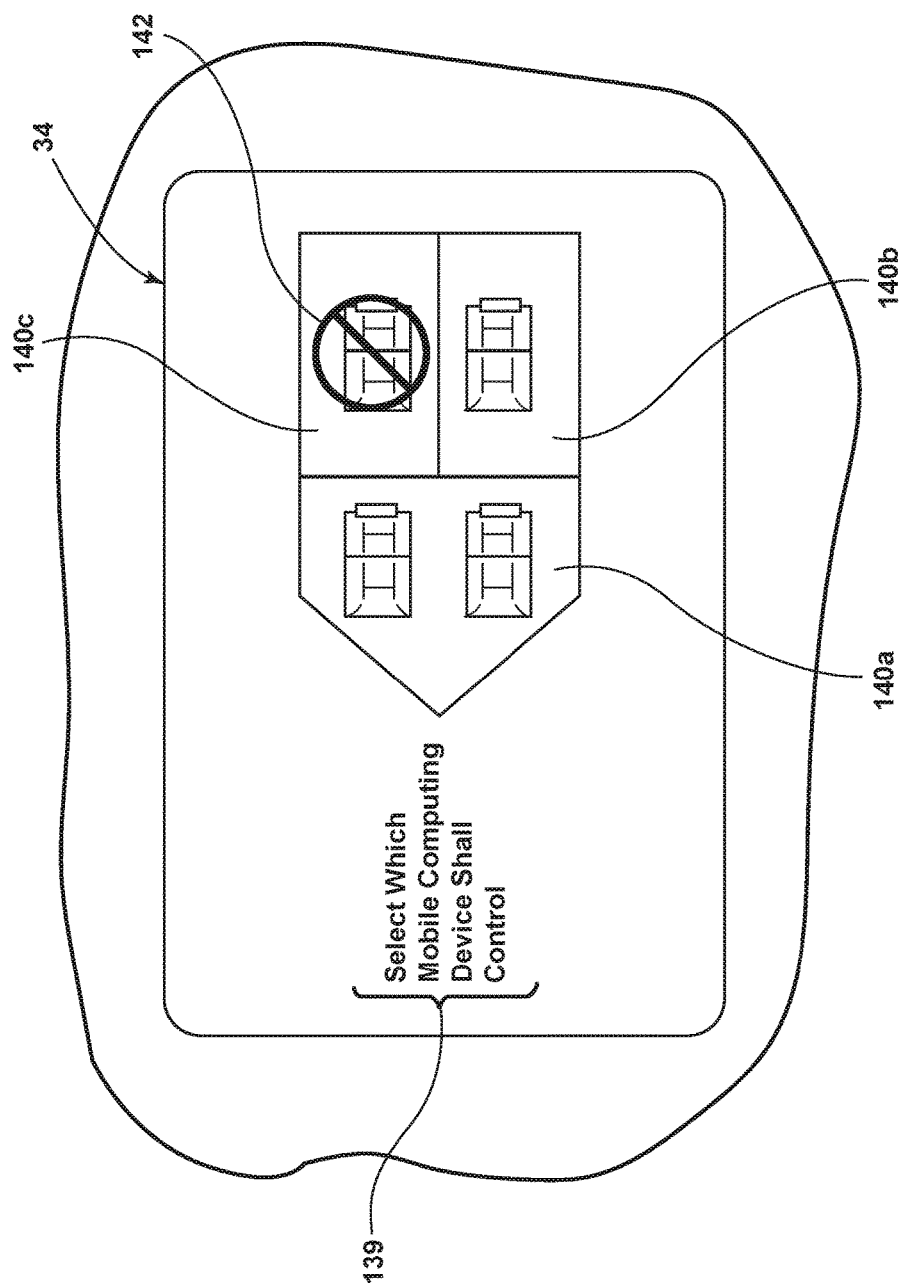

SEATING ASSEMBLY TO SUPPORT A MOBILE COMPUTING DEVICE AND METHOD OF SUPPORTING THE MOBILE COMPUTING DEVICE WITH THE SEATING ASSEMBLY

FIELD OF THE INVENTION

The present invention generally relates to a seating assembly within an interior of a vehicle that supports a mobile computing device and provides a connection whereby the mobile computing device can synchronize with and control a communications and entertainment computing system onboard the vehicle.

BACKGROUND OF THE INVENTION

Luxury vehicles sometimes include an entertainment system with a video display on a rear portion of a seating assembly located in a front row of seating. Thus, an occupant of a second row of seating can use the entertainment system to display a video on the video display for entertainment. Non-luxury vehicles typically do not provide such entertainment systems built into the seating assembly.

SUMMARY OF THE INVENTION

According to a first aspect of the present invention, a seating assembly for a vehicle comprises: a seatback including a first lower support member attached to a top portion, the lower support member including an upward extension; and a headrest coupled to the seatback, the headrest including a bottom portion facing the top portion of the seatback and an upper support member disposed at the bottom portion of the headrest, the upper support member including a downward extension.

Embodiments of the first aspect of the invention can include any one or a combination of the following features:
 the headrest further includes a first coupling member extending downward from the bottom portion;
 the coupling member projects into the seatback;
 the headrest is adjustable relative to the seatback such that the distance between the top portion of the seatback and the bottom portion of the headrest can be altered by adjusting how far the first coupling member of the headrest projects into the seatback;
 the first lower support member further including an aperture;
 the first coupling member of the headrest extends through the aperture of the first lower support member;
 the upward extension of the first lower support member is disposed rearward from the aperture of the first lower support member;
 the seatback further includes a second lower support member attached to the top portion of the seatback;
 the second lower support member also includes an upward extension that is parallel to the upward extension of the first lower support member and an aperture;
 the headrest further includes a second coupling member extending downward from the bottom portion and parallel to the first coupling member;
 the second coupling member extends through the aperture of the second lower support member and projects into the seatback;
 the upward extension of the second lower support member is disposed rearward of the aperture of the second lower support member;
 the downward extension of the upper support member is disposed between the first coupling member and the second coupling member;
 the seating assembly further includes a mobile computing device, which includes a display, disposed between the top portion of the seatback and the bottom portion of the headrest, such that the downward extension of the upper support member, the upward extension of the first lower support member, and the upward extension of the second lower support member support the mobile computing device;
 the headrest further includes a downward extending portion that extends generally orthogonally downward relative to the bottom portion of the headrest;
 the downward extending portion is disposed forward of the mobile computing device and has a width that is wider than the distance between the upward extension of the first lower support member and upward extension of the second lower support member;
 the width of the downward extending portion is wider than a width of the downward extension of the upper support member;
 the seating assembly further includes a connection port that enables a mobile computer to connect with a communications and entertainment computing system within the vehicle; and
 a wire connects the mobile computing device to the connection port.

According to a second aspect of the present invention, a method of supporting a mobile computing device in a vehicle comprises: providing a seating assembly disposed in an interior of a vehicle, the seating assembly comprising a seatback and a headrest adjustably coupled to the seatback; placing a mobile computing device between the seatback and the headrest; and adjusting the headrest relative to the seatback such that the seatback and the headrest support the mobile computing device.

Embodiments of the second aspect of the invention can include any one or a combination of the following features:
 the seatback further comprises a first lower support member including an upward extension, wherein, placing a mobile computing device between the seatback and the headrest includes placing the mobile computing device adjacent and forward the upward extension of the first lower support member, and wherein, the upward extension of the first lower support member further supports the mobile computing device;
 the headrest further comprises an upper support member including a downward extension, wherein, placing a mobile computing device between the seatback and the headrest further includes placing the mobile computing device adjacent and rearward the downward extension of the upper support member, and wherein, the downward extension further supports the mobile computing device;
 the headrest further includes a first coupling member extending downward from the bottom portion and projecting into the seatback, wherein, placing a mobile computing device between the seatback and the headrest further includes placing the mobile computing device rearward of the first coupling member, and wherein, adjusting the headrest relative to the seatback such that the seatback and the headrest support the mobile computing device includes causing the coupling member to move further within the seatback;
 the first lower support member further includes an aperture, which the first coupling member of the headrest extends through, wherein adjusting the headrest relative to the seatback such that the seatback and the headrest support the mobile computing device further includes causing the coupling member to move within the aperture of the first lower support member;

the seatback further includes a second lower support member, which also includes an upward extension that is parallel to the upward extension of the first lower support member and an aperture;

the headrest further includes a second coupling member that is parallel to the first coupling member, extends through the aperture of the second lower support member, and projects into the seatback;

placing a mobile computing device between the seatback and the headrest further includes placing the mobile computing device adjacent and forward the upward extension of the second lower support member;

the upward extension of the second lower support member further supports the mobile computing device;

adjusting the headrest relative to the seatback such that the seatback and the headrest support the mobile computing device includes causing the second coupling member to move further within the seatback;

the headrest further includes a downward extending portion that is forward of the upper support member, wherein, placing a mobile computing device between the seatback and the headrest further includes placing the mobile computing device rearward of the downward extending portion of the headrest;

the seating assembly further includes a connection port that enables a mobile computer to connect with a communications and entertainment computing system within the vehicle;

the method further comprises connecting the mobile computing device to the connection port;

the method further comprises synchronizing the mobile computing device with the communications and entertainment computing system within the vehicle; and the method further comprises controlling audio output of a speaker system within the vehicle with the mobile computing device.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 7A is a rear perspective view of the headrest and seatback of FIG. 2, illustrating the headrest in a lowered position relative to the seatback;

FIG. 7B is a rear perspective view of the headrest and seatback of FIG. 2, illustrating the headrest in a raised position relative to the seatback;

FIG. 8 is a rear perspective view of the headrest and seatback of FIG. 2, illustrating the headrest in the raised position and a mobile computing device placed between the headrest and the seatback;

FIG. 9 is a rear perspective view of the headrest of FIG. 2 moving from the raised position toward the seatback until the mobile computing device prevents further movement;

FIG. 13 is a view of the user interface of FIG. 1, illustrating graphical representations for the operator to touch to make a selection regarding which mobile computing device shall control the communications and entertainment computing system.

DETAILED DESCRIPTION OF THE PREFERRED EMBODIMENTS

For purposes of description herein, the terms "lower," "top," "upward," "bottom," "upper," "downward," "rearward," "forward," "front," "rear," "raised," "lowered," "below," and derivatives thereof, shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
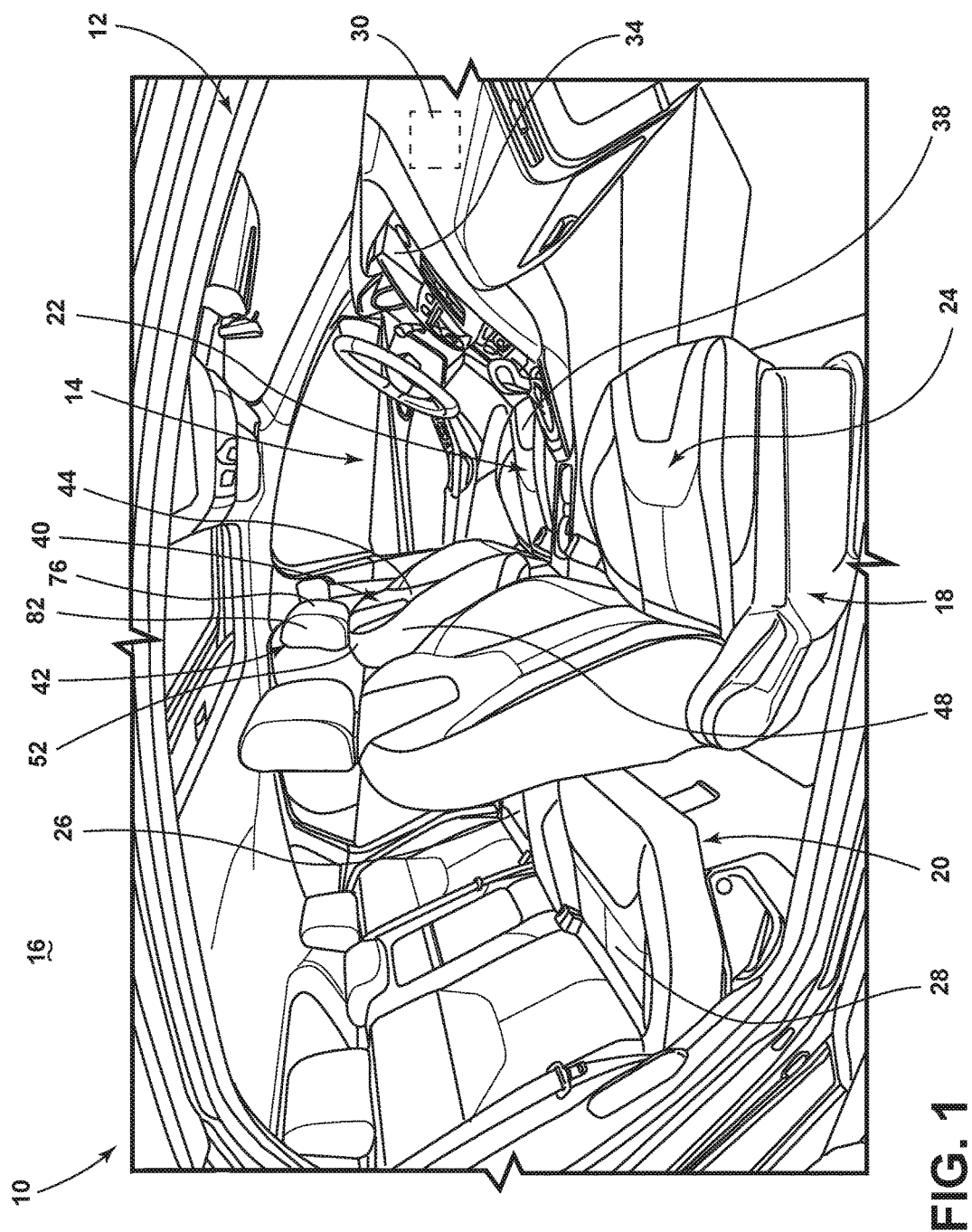
FIG. 1 is a perspective view of an interior of a vehicle, illustrating a first row of seating with a seating assembly for an operator of the vehicle and a second row of seating.
Figure 1A:
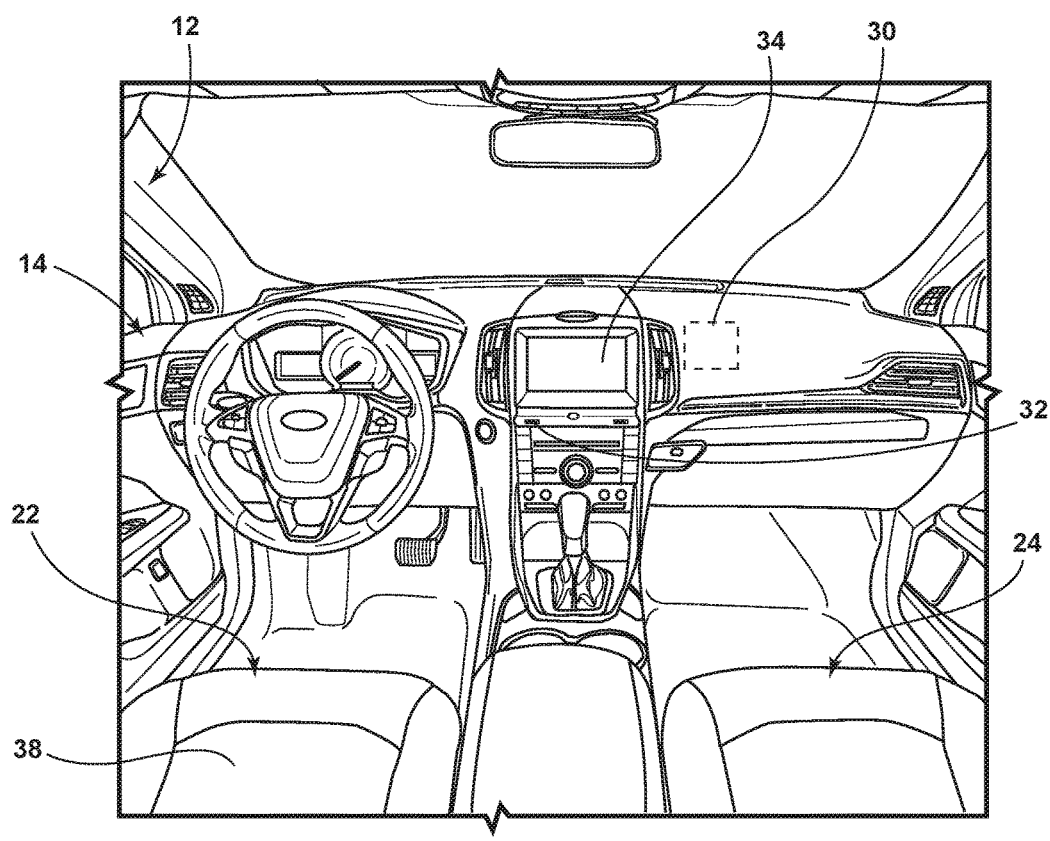
FIG. 1A is a perspective view of a user interface and a primary connection port in communication with a communications and entertainment computing system of the vehicle of FIG. 1.
Figure 2:
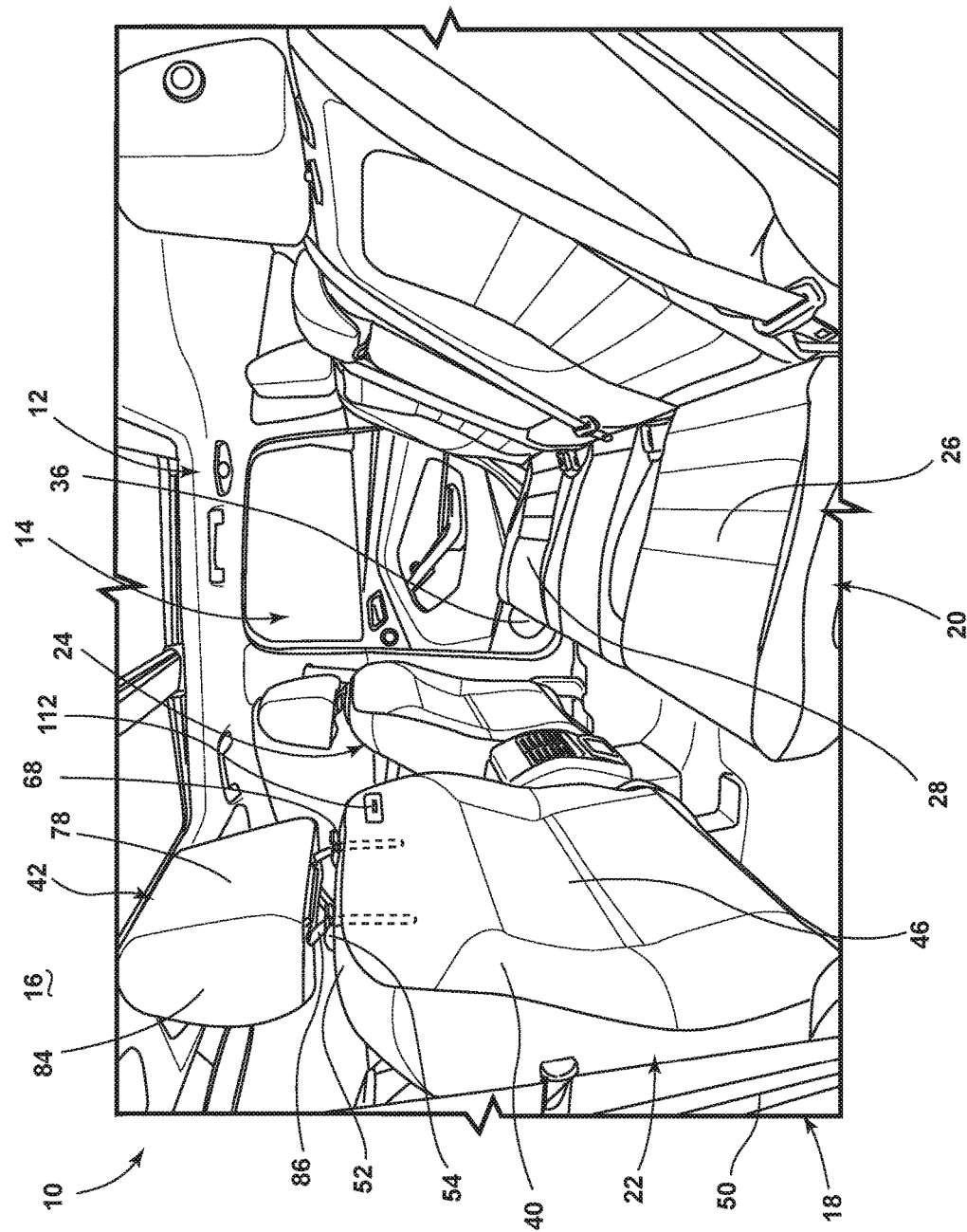
FIG. 2 is a perspective view of the interior of the vehicle of FIG. 1, illustrating the seating assembly of FIG. 1 with a headrest coupled to a seatback, which includes a connection port.

Referring to FIGS. 1, 1A, and 2, a vehicle 10 includes a frame 12 separating an interior 14 from an exterior 16. The vehicle 10 further includes a first row of seating 18 and a second row of seating 20 rearward of (i.e., behind) the first row of seating 18. The vehicle 10 may further include a third row of seating (not illustrated) behind the second row of seating 20, and so on. The vehicle 10 can be a car, truck, sport utility vehicle, or van, among other things.

The first row of seating 18 includes a seating assembly 22 for an operator of the vehicle 10 to occupy. The first row of seating 18 can further include another seating assembly 24, adjacent the seating assembly 22 (or separated from the seating assembly 22 by a console) for a passenger of the vehicle 10 to occupy. The second row of seating 20 may be for additional passengers of the vehicle 10 to occupy. An occupant of the second row of seating 20 faces in the general direction of the first row of seating 18. For example, a passenger occupying seat 26 of the second row of seating 20 faces the seating assembly 22 of the first row of seating 18. Likewise, a passenger occupying seat 28 of the second row of seating 20 faces the other seating assembly 24 of the first row of seating 18.

The vehicle 10 further includes a communications and entertainment computing system 30. Examples of a communications and entertainment computing system 30 are the SYNC® 3 provided by Ford Motor Company, ENTUNE® by Toyota Motor Sales, U.S.A., Inc., and MyLink provided by General Motors. A "communications and entertainment computing system" is sometimes referred to as an "infotainment system" and the former phrase is intended to include the latter phrase. The vehicle 10 further includes a primary connection port 32, accessible to an occupant occupying the first row of seating 18, in communication with the communications and entertainment computing system 30. The vehicle 10 further includes a user interface 34, which can be a touch screen, in communication with the communications and entertainment computing system 30. The communications and entertainment computing system 30 can display information and request operator feedback via touchable selections via the user interface 34. The vehicle 10 can further include a speaker system including speaker 36 and other speakers (not shown) located within the vehicle 10. The speaker system, including speaker 36, can output audio (i.e., sound, such as music).

The seating assembly 22 includes a seat 38, a seatback 40, and a headrest 42 coupled to the seatback 40. The seatback 40 generally pivots forward and rearward to change the angular relation of the seatback 40 to the seat 38. The seatback 40 includes a front portion 44, a rear portion 46, a side portion 48, another side portion 50, and a top portion 52. The front portion 44 generally faces and supports an occupant of the seating assembly 22. An occupant of the seat 26 of the second row of seating 20 faces the rear portion 46 of the seating assembly 22. The top portion 52 is the upper most part of the seatback 40 and at least part of the top portion 52 faces the headrest 42. The other seating assembly 24 of the first row of seating 18 is identical in all respects to the seating assembly 22 and any discussion herein of the components of the seating assembly 22 applies equally to the other seating assembly 24.

Figure 3:
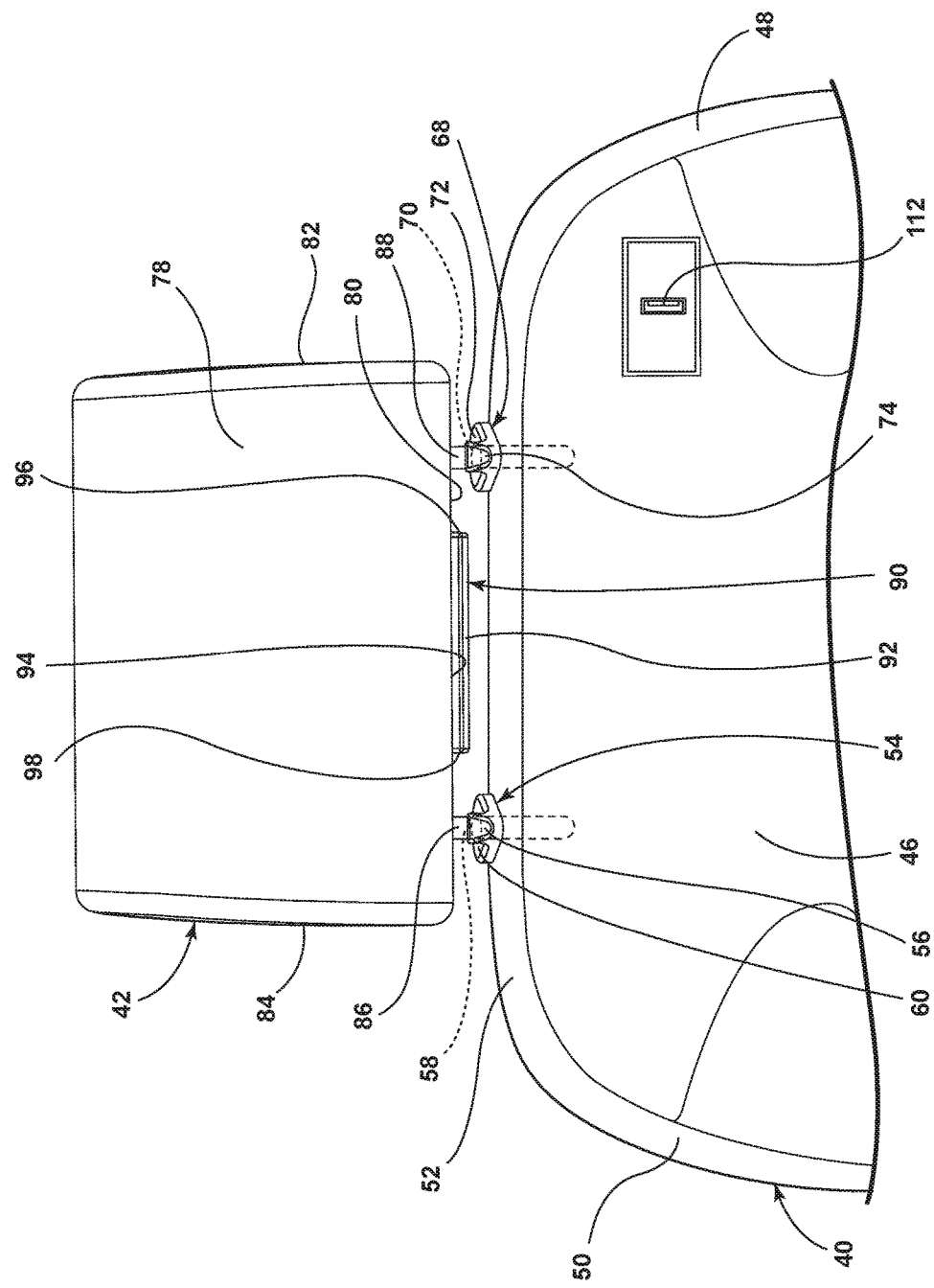
FIG. 3 is a rear view of the headrest and seatback of FIG. 2, illustrating a first lower support member and a second lower support member attached to a top portion of the seatback.
Figure 4:
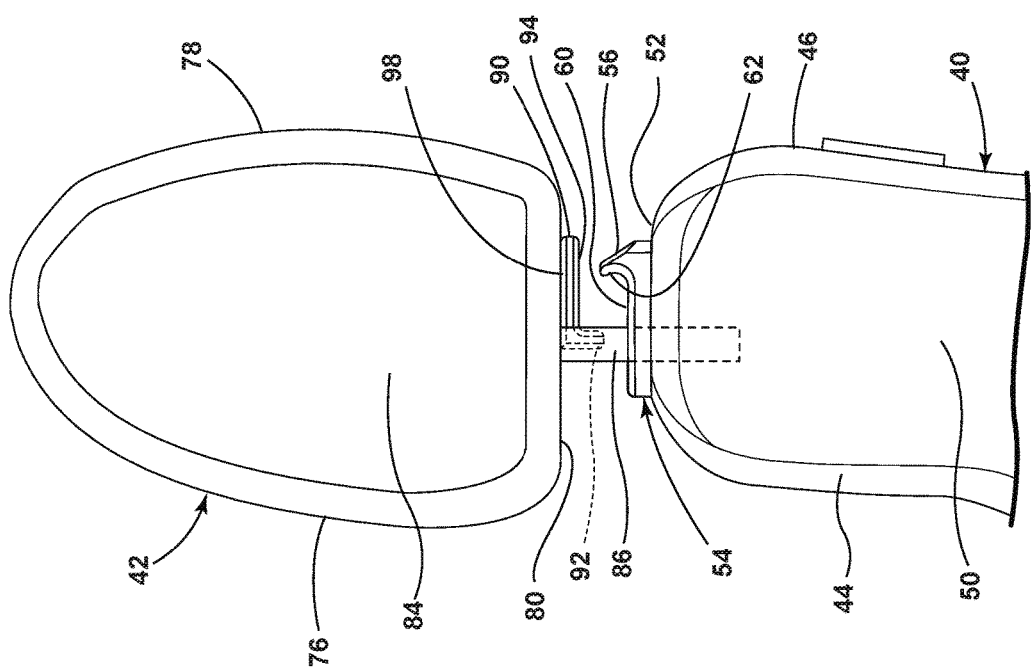
FIG. 4 is a side view of the headrest and seatback of FIG. 2, illustrating an upper support member attached to the headrest and a first coupling member coupling the headrest to the seatback.
Figure 5B:
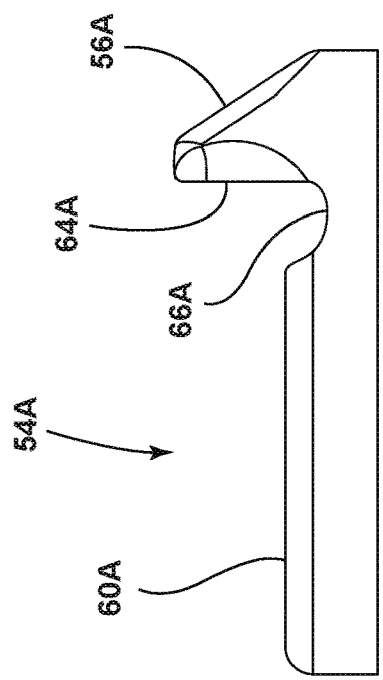
FIG. 5B is a side view of the alternative embodiment of the first lower support member of FIG. 5A.
Figure 5A:
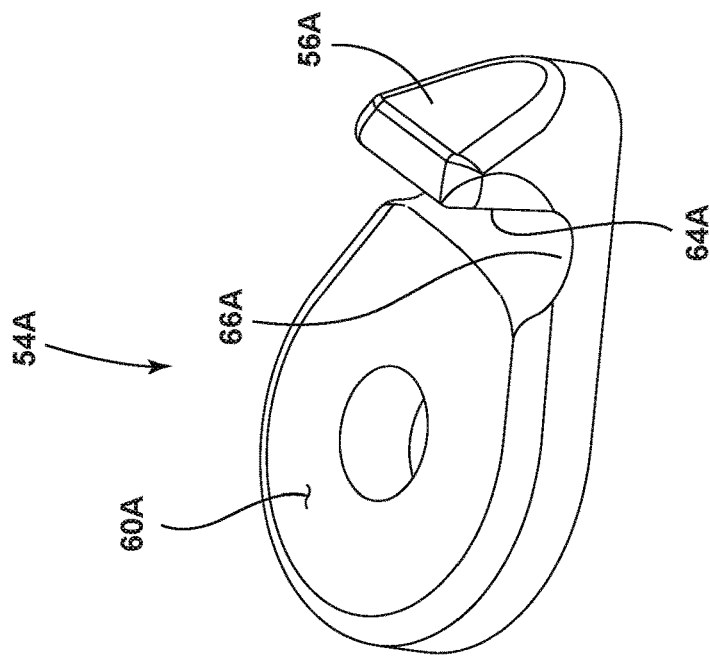
FIG. 5A is a perspective view of an alternative embodiment of the first lower support member of FIG. 3, illustrating a groove transitioning between a planar surface and an orthogonal surface.

Referring now particularly to FIGS. 3-4, the seatback 40 further includes a first lower support member 54. The first lower support member 54 is attached to the seatback 40 at the top portion 52. The first lower support member 54 includes an upward extension 56. The first lower support member 54 may further include an aperture 58. The upward extension 56 is disposed rearward from the aperture 58. The first lower support member 54 may additionally include a planar surface 60 facing the headrest 42, as this embodiment of the first lower support member 54 does. The upward extension 56 extends upward relative to the planar surface 60. In this embodiment, the upward extension 56 forms a hooked surface 62. Referring to FIG. 5A and 5B, in an alternative embodiment of the first lower support member 54, first lower support member 54A, an upward extension 56A provides an orthogonal surface 64A relative to a planar surface 60A and a groove 66A adjacent the upward extension 56A, transitioning between the planar surface 60A and the orthogonal surface 64A.

Referring again particularly to FIG. 3, the seatback 40 further includes a second lower support member 68 attached to the top portion 52 of the seatback 40. The second lower support member 68 is identical to the first lower support member 54 and thus includes an aperture 70, a planar surface 72, and an upward extension 74 disposed rearward of the aperture 70. The planar surface 72 of the second lower support member 68 is parallel to the planar surface 60 of the first lower support member 54. The upward extension 74 of the second lower support member 68 is parallel to the upward extension 56 of the first lower support member 54. If the alternative embodiment first lower support member 54A is utilized on the seatback 40, the second lower support member 68 can include the same differentiating alternative features discussed above for the first lower support member 54A.

Referring again particularly to FIGS. 3-4, the headrest 42 includes a front portion 76 (see also FIG. 1), a rear portion 78, a bottom portion 80, a side portion 82, and another side portion 84. The front portion 76 faces and supports the head of an occupant occupying the seating assembly 22. An occupant of the seat 26 of the second row of seating 20 faces the rear portion 78 of the headrest 42. The side portion 82 faces the same general direction as the side portion 48 of the seatback 40. The other side portion 84 faces the same general direction as the other side portion 50 of the seatback 40. The bottom portion 80 faces the top portion 52 of the seatback 40.

The headrest 42 further includes a first coupling member 86, which couples the headrest 42 to the seatback 40. The headrest 42 further includes a second coupling member 88, which also couples the headrest 42 to the seatback 40. The first coupling member 86 and the second coupling member 88 can be shaped identically. In this embodiment of the seating assembly 22, the first coupling member 86 and the second coupling member 88 are spaced apart metal bars. The first coupling member 86 and the second coupling member 88 project into the seatback 40. Alternative embodiments of the seating assembly 22 (not shown) may use only the first coupling member 86, which in that embodiment could be a wider, wall-like, plastic or metal component that projects into the seatback 40. The first coupling member 86 extends downward from the bottom portion 80 of the headrest 42 and through the aperture 58 of the first lower support member 54 before projecting into the seatback 40. The aperture 58 of the first lower support member 54 surrounds the first coupling member 86. The second coupling member 88 likewise extends downward from the bottom portion 80 of the headrest 42 and through the aperture 70 of the second lower support member 68 before projecting into the seatback 40. The aperture 70 of the second lower support member 68 surrounds the second coupling member 88.

The headrest 42 further includes an upper support member 90. The upper support member 90 is disposed at the bottom portion 80 of the headrest 42 and can be attached to the bottom portion 80. The upper support member 90 includes a downward extension 92. The downward extension 92 extends downward away from the bottom portion 80 of the headrest 42 toward the top portion 52 of the seatback 40. The upper support member 90 further includes a planar surface 94, which may be generally parallel to the planar surface 60 of the first lower support member 54 and the planar surface 72 of the second lower support member 68. The downward extension 92 extends generally orthogonally downward from the planar surface 94 and the bottom portion 80 of the headrest 42. The downward extension 92 has a side 96 disposed toward the side portion 82 of the headrest 42 and another side 98 disposed toward the other side portion 84 of the headrest 42. The downward extension 92 is disposed generally between the first coupling member 86 and the second coupling member 88. That is, the other side 98 of the upper support member 90 is disposed closer to the first coupling member 86 than the other side portion 84 of the headrest 42. Likewise, the side 96 of the upper support member 90 is disposed closer to the second coupling member 88 that to the side portion 82 of the headrest 42. In an alternative embodiment (not illustrated), the upper support member 90 extends most or all of the length of the headrest 42 between the side portion 82 and the other side portion 84 of the headrest 42.

Figure 6A:
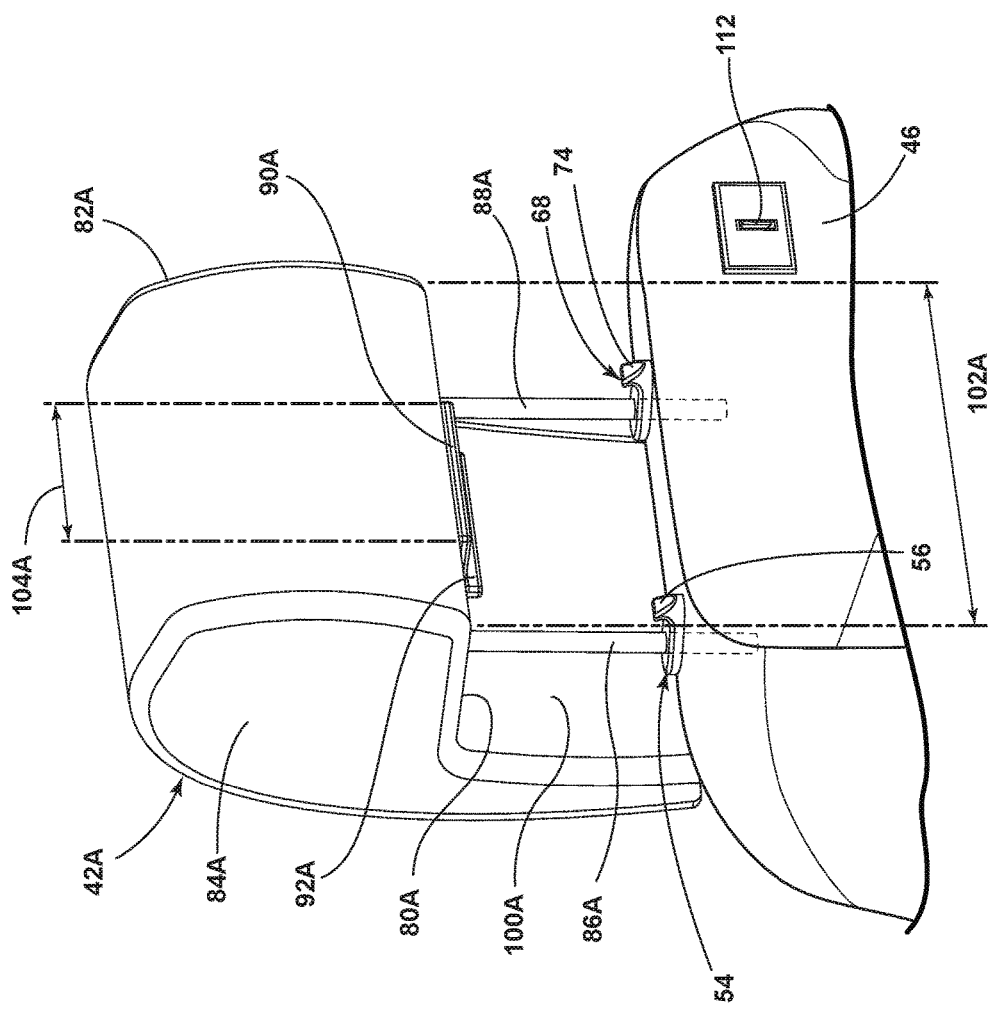
FIG. 6A is a rear perspective view of an alternative embodiment of the headrest of FIG. 2, illustrating a downward extending portion forward of an upper support member.
Figure 6B:
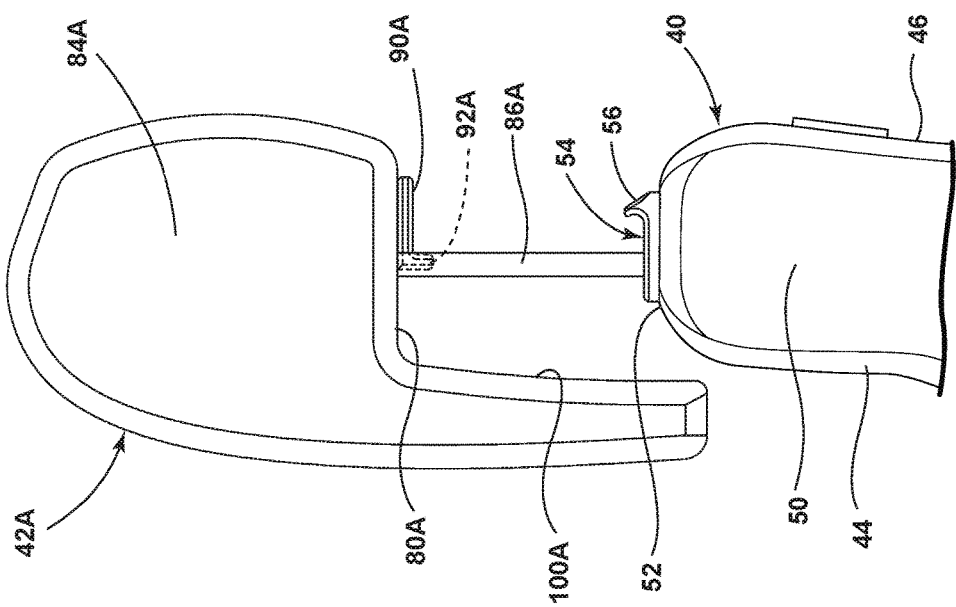
FIG. 6B is a side view of the alternative embodiment of the headrest of FIG. 6A.

Referring now to FIGS. 6A and 6B, an alternative embodiment of the headrest 42, specifically, headrest 42A, is illustrated. Headrest 42A, which is otherwise identical to headrest 42 (and thus includes a rear portion 78A, a bottom portion 80A, a side portion 82A, and another side portion 84A), further includes a downward extending portion 100A that extends generally orthogonally downward relative to the bottom portion 80A. The downward extending portion 100A is disposed forward of the first coupling member 86A and the second coupling member 88A. The downward extending portion 100A is additionally forward the upper support member 90A. The downward extending portion 100A can have a width 102A that is wider than the distance between the upward extension 56 of the first lower support member 54 and upward extension 74 of the second lower support member 68. Similarly, the width 102A of the downward extending portion 100A can be wider than a width 104A of the downward extension 92A of the upper support member 90A. The downward extending portion 100A can extend from side portion 82A of the headrest 42A to the other side portion 84A.

Referring now to FIGS. 7A and 7B, the headrest 42 is adjustable relative to the seatback 40 to that the headrest 42 can be positioned to and between a lowered position 106 (FIG. 7A) and a raised position 108 (FIG. 7B). More specifically, a distance 110 between the top portion 52 of the seatback 40 and the bottom portion 80 of the headrest 42 can be adjusted. The distance 110 can be adjusted by manipulating how far the first coupling member 86 and, if utilized, the second coupling member 88, of the headrest 42 projects into the seatback 40. In general terms, the headrest 42 can be adjusted up or down relative to the seatback 40. The bottom portion 80 of the headrest 42 is closer to the seatback 40 in the lowered position 106 than it is in the raised position 108 and thus the first coupling member 86 (and the second coupling member 88, if used) projects further into the seatback 40 in the lowered position 106 than it does in the raised position 108. In another embodiment (not illustrated), the downward extension 92 of the upper support member 90 can extend downward to the top portion 52 of the seatback 40 when the headrest 42 is in the raised position 108. In such an embodiment, the downward extension 92 can project into the seatback 40, similar to the first coupling member 86 and the second coupling member 88 when the headrest 42 is in the lowered position 106.

The seating assembly 22 further includes a connection port 112. The connection port 112 is in addition to the primary connection port 32 accessible from the first row of seating 18 (see FIG. 1A). In this embodiment, the connection port 112 is disposed at the seatback 40, more specifically, the rear portion 46 of the seatback 40. The connection port 112 could likewise be disposed at the headrest 42 or at another portion of the seatback 40, such as the top portion 52. The connection port 112, as discussed more fully below, enables a mobile computing device 114 to connect with the communications and entertainment computing system 30 within the vehicle 10.

Figure 10:
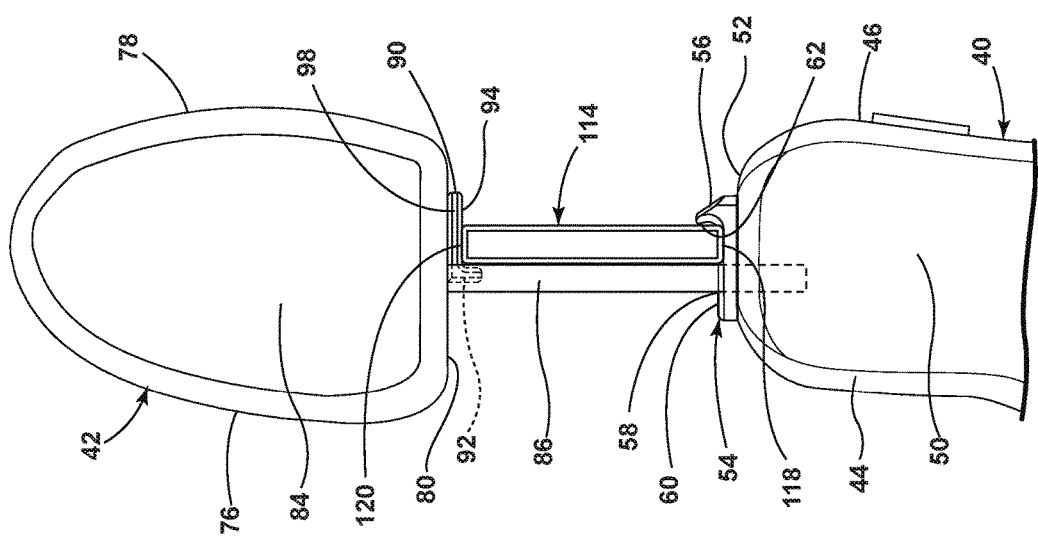
FIG. 10 is a side view of the mobile computing device disposed between the seatback and headrest of FIG. 2, illustrating the upper support member and lower support member supporting the mobile computing device.

Referring now to FIGS. 8-10, a novel method of supporting the mobile computing device 114 in a vehicle 10 with the seating assembly 22 is disclosed. The mobile computing device 114 can be a smartphone (such as the IPHONE® 7, by Apple, Inc.), a tablet (such as the IPAD®, by Apple, Inc.), and any other device that stores audio and/or video for playback or can stream audio and/or video for playback from another source. The mobile computing device 114 will typically have a display 116. If the headrest 42 is in the lowered position 106 (see FIG. 7A), then the headrest 42 is raised toward or to the raised position 108 (such as in FIG. 8).

The method further includes placing the mobile computing device 114 between the seatback 40 and the headrest 42. More specifically, the mobile computing device 114 is placed adjacent and forward the upward extension 56 of the first lower support member 54. In other words, the upward extension 56 of the first lower support member 54 is rearward the mobile computing device 114. The mobile computing device 114 is between the upward extension 56 of the first lower support member 54 and the first coupling member 86. The mobile computing device 114 is placed rearward of the first coupling member 86. In addition, the mobile computing device 114 is placed adjacent and rearward the downward extension 92 of the upper support member 90. The downward extension 92 of the upper support member 90 is forward the mobile computing device 114. In embodiments including the second lower support member 68, the mobile computing device 114 is placed adjacent and forward the upward extension 74 of the second lower support member 68, in the same manner as the first lower support member 54. In some embodiments, the mobile computing device 114 may abut the first coupling member 86 and the second coupling member 88.

The headrest 42 is then adjusted relative to the seatback 40 such that the seatback 40 and the headrest 42 support the mobile computing device 114, such as by moving (see FIG. 9) the headrest 42 in a direction 107 toward the lowered position 106 until the mobile computing device 114 prevents further movement of the headrest 42 toward the lowered position 106. As the headrest 42 is adjusted/moved closer to the seatback 40 (the distance 110 decreases), the first coupling member 86 is caused to move within the aperture 58 of the first lower support member 54 and further within the seatback 40. In embodiments that include the second coupling member 88, as the headrest 42 is adjusted closer to the seatback 40, the second coupling member 88 is caused to move within the aperture 70 of the second lower support member 68 and further within the seatback 40. The planar surface 60 of the first lower support member 54 may support the mobile computing device 114 from below the mobile computing device 114. The first lower support member 54 further supports the mobile computing device 114 by preventing a side 118 of the mobile computing device 114 from moving rearward or downward. The upper support member 90 further supports the mobile computing device 114 by preventing another side 120 of the mobile computing 114 device from moving upward or forward. The downward extension 92 of the upper support member 90 supports the mobile computing device 114 by preventing the other side 120 of the mobile computing device 114 from moving forward. The planar surface 94 of the upper support member 90 supports the mobile computing device 114 by preventing the other side 120 of the mobile computing device 114 from moving upward. In embodiments including the second lower support member 68, the upward extension 74 of the second lower support member 68 further supports the mobile computing device 114 by preventing the mobile computing device 114 from moving rearward. The second lower support member 68 supports the mobile computing device 114 by preventing the mobile computing device 114 from moving downward. In some embodiments, the first coupling member 86 and the second coupling member 88 may contact (abut) and support the mobile computing device 114 by preventing the mobile computing device 114 from moving forward. The mobile computing device 114 is now disposed between the top portion 52 of the seatback 40 and the bottom portion 80 of the headrest 42, such that the downward extension 92 of the upper support member 90, the upward extension 56 of the first lower support member 54, and the upward extension 74 of the second lower support member 68 support the mobile computing device 114.

In the event that the alternative embodiment first lower support member 54A (see FIG. 5A-5B) and a second lower support member of the same design were utilized to support the mobile computing device 114, the side 118 of the mobile computing device 114 could be disposed within the groove 66A. The groove 66A supports the mobile computing device 114 by preventing the side 118 of the mobile computing from moving down and to some extent forward. The orthogonal surface 64A of the upward extension 56A supports the mobile computing device 114 by preventing the side 118 of the mobile computing device from moving rearward.

The method can further include connecting the mobile computing device 114 to the connection port 112. A wire 122 (see FIG. 9) can connect the mobile computing device 114 to the connection port 112. The connection port 112 can also provide electricity to the mobile computing device 114, such as to charge a battery (not illustrated) within the mobile computing device 114.

Figure 11A:
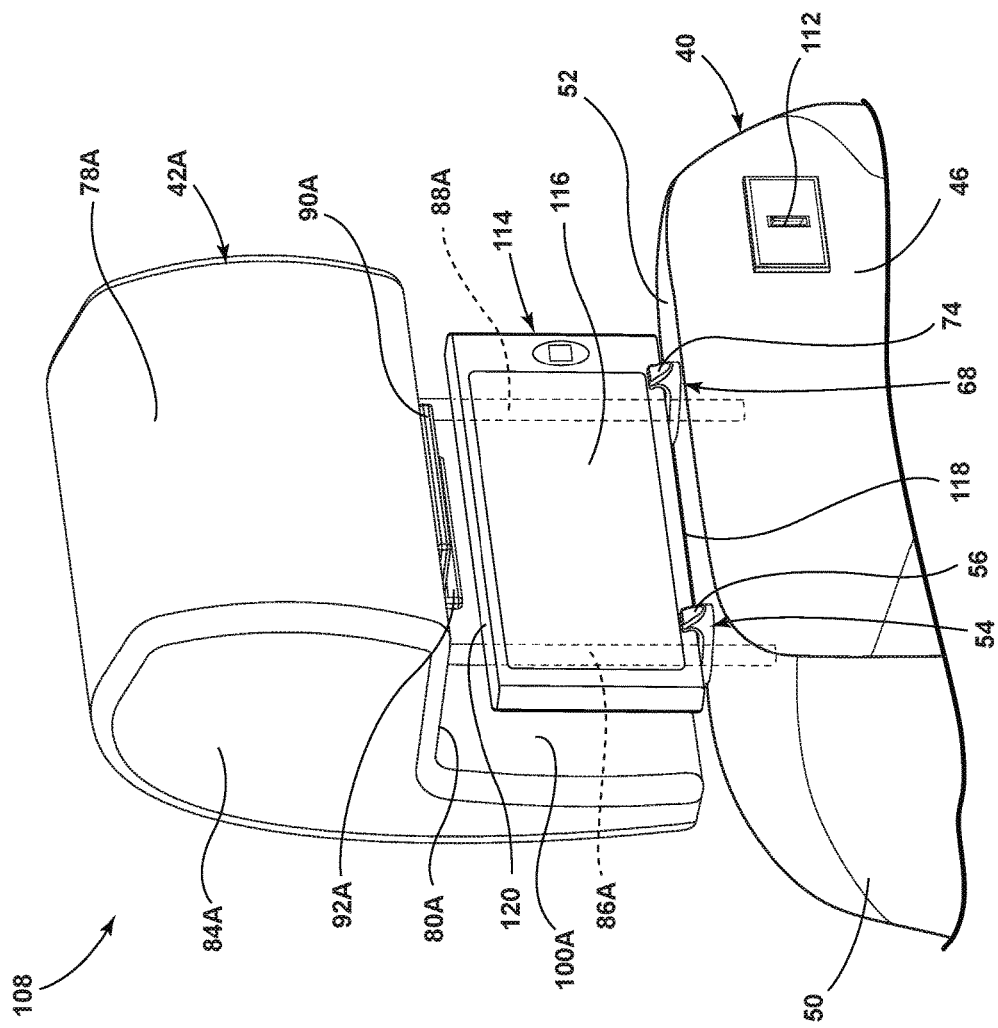
FIG. 11A is a rear perspective view of the alternative embodiment of the headrest of FIG. 6A, illustrating the mobile computing device between the headrest in a raised position and the seatback.
Figure 11B:
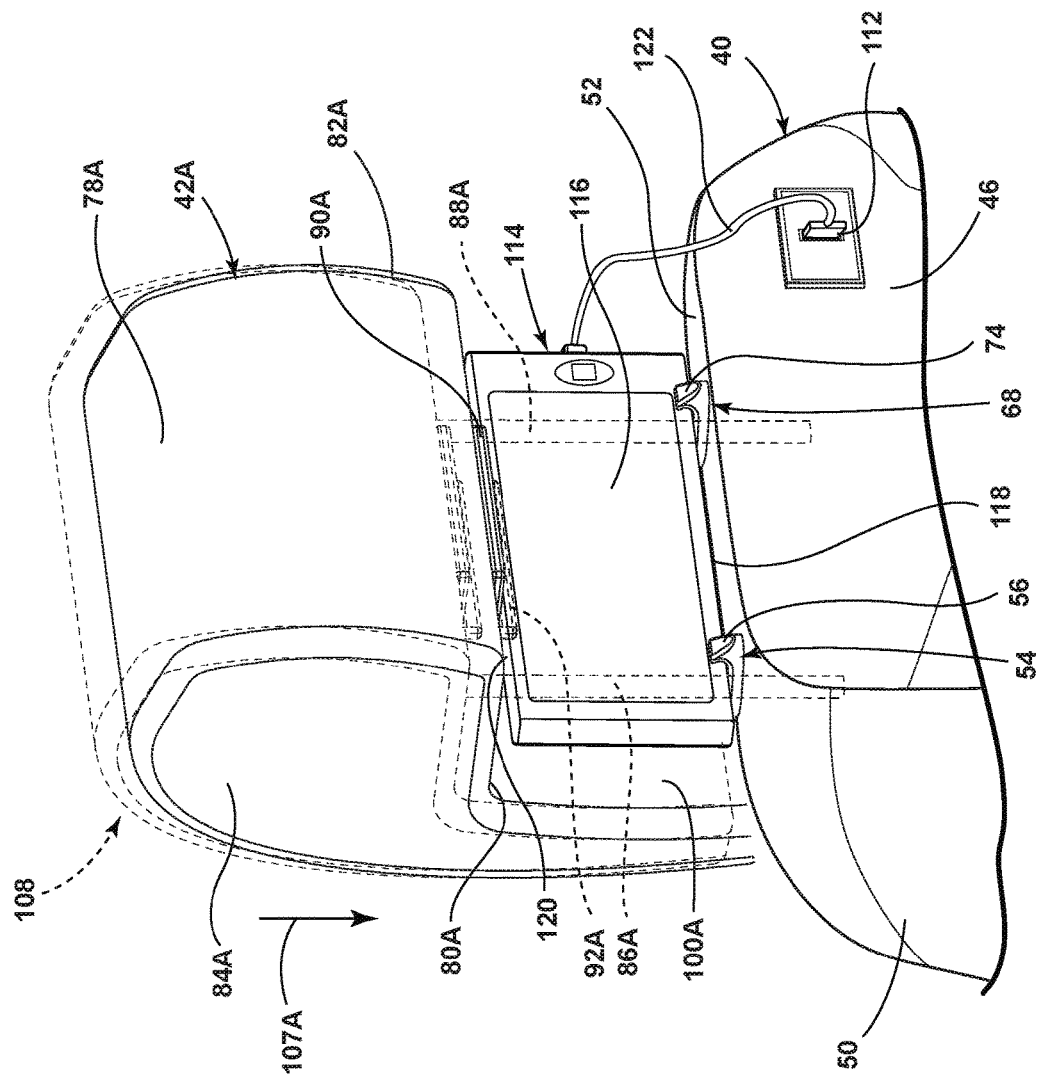
FIG. 11B is a rear perspective view of the alternative embodiment of the headrest of FIG. 6A, illustrating the headrest being moved toward the seatback to support the mobile computing device.

Referring now to FIGS. 11A-11B, the alternative embodiment headrest 42A, is illustrated first in the raised position 108 (FIG. 11A) as the mobile computing device 114 is placed between the headrest 42A and the seatback 40. When the headrest 42A is utilized, the step of placing the mobile computing device 114 between the seatback 40 and the headrest 42A further includes placing the mobile computing device 114 rearward of the downward extending portion 100A of the headrest 42A. In other words, the downward extending portion 100A is disposed forward of the mobile computing device 114. The headrest 42A is then moved downward in a direction 107A toward the lowered position 106 until the mobile computing device 114 prevents further downward movement (FIG. 11B), in the same manner described above for the headrest 42. Depending on the size and shape of the mobile computing device 114, the downward extending portion 100A may further support the mobile computing device 114 by preventing the mobile computing device 114 from moving forward. The first lower support member 54, the second lower support member 68, the upper support member, the first coupling member 86A, the second coupling member 88A all support the mobile computing device 114 in the same manner described above for the headrest 42. The downward extending portion 100A can be disposed forward of the front portion 44 of the seatback 40.

It should be understood that the other seating assembly 24 of the first row of seating 18 can be identical to seating assembly 22, and support the mobile computing device 114 and/or another mobile computing device in a like manner, allowing connection to the communications and entertainment computing system 30 through a connection port. The discussion above for the seating assembly 22 supporting mobile computing device 114 applies to seating assembly 24. Further, it should be understood that headrests present on the second row of seating 20 can support the mobile computing device 114 and/or another mobile computing in the same manner described above, and allow provide a connection to the communications and entertainment computing system 30, when the vehicle 10 has a third row of seating.

Figure 12:
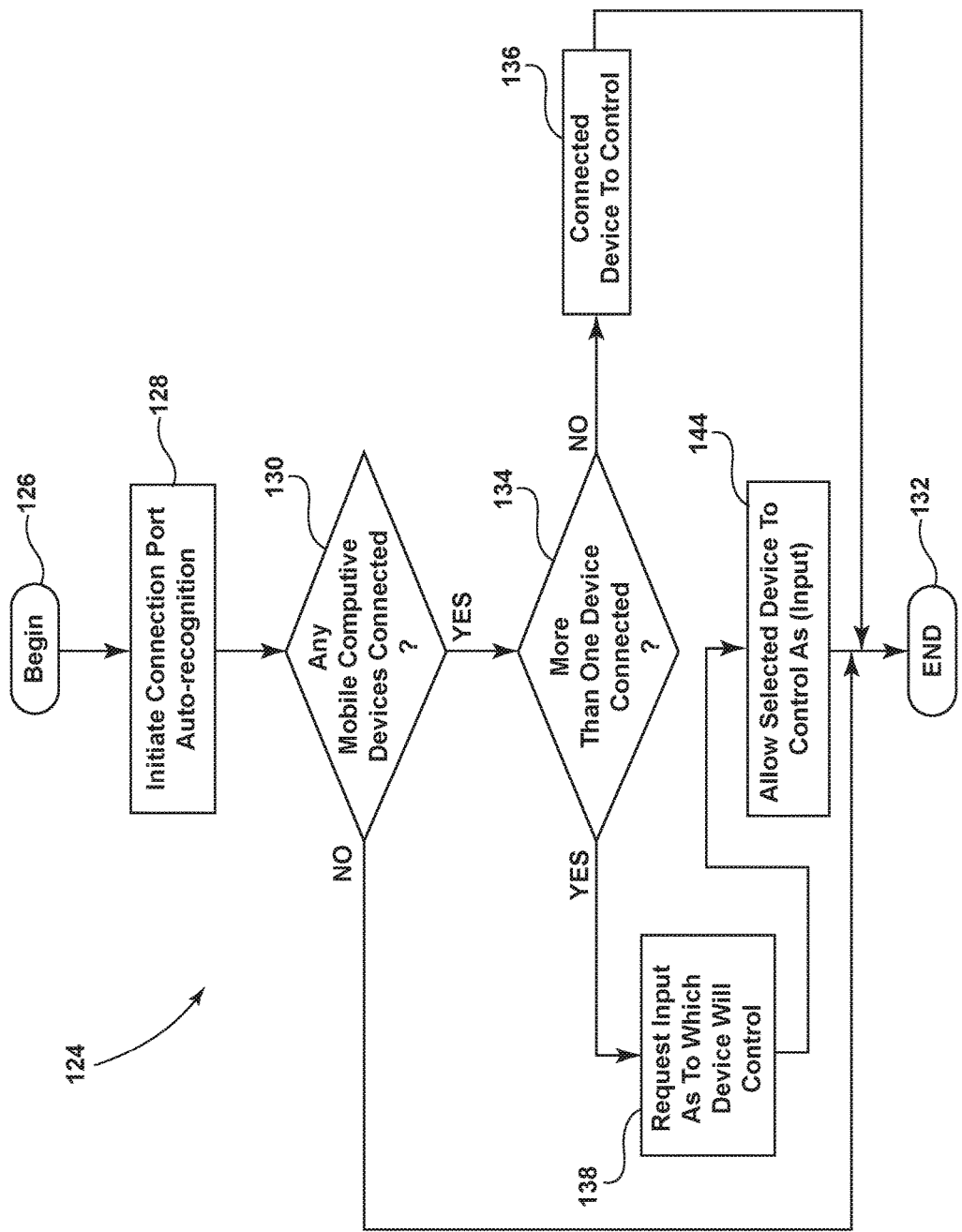
FIG. 12 is a flowchart for a synchronizing routine stored and executed by the communications and entertainment computing system of FIG. 1A.

The method can further include synchronizing the mobile computing device 114 with the communications and entertainment computing system 30. For example, as illustrated in FIG. 12 the communications and entertainment computing system 30 can store and execute a synchronizing routine 124. More specifically, the communications and entertainment computing system 30 can include memory that stores the synchronizing routine 124 and a microprocessor in communication with the memory that executes the synchronizing routine 124. The synchronizing routine 124 begins at step 126. The synchronizing routine 124 proceeds to step 128, where the communications entertainment computing system 30 recognizes to which connection port(s) of the connection ports (including primary connection port 32 and connection port 112) disposed in the vehicle 10, if any, a mobile computing device, including the mobile computing device 114, is connected. At step 130, the synchronizing routine 124 queries whether any mobile computing devices are connected. If the answer to the query is "NO," then the synchronizing routine 124 proceeds to step 132, ending the synchronizing routine 124. However, if the answer to the query is "YES," then the synchronizing routine 124 proceeds to step 134. At step 134, the synchronizing routine 124 queries whether more than one mobile computing device is connected. If the answer to the query is "NO," then the synchronizing routine 124 proceeds to step 136, where the sole connected mobile computing device, which can be the mobile computing device 114, is allowed to control the communications and entertainment computing system 30. The synchronizing routine 124 then proceeds to step 132, ending the synchronizing routine 124. However, if the answer to the query of step 134 is "YES," then the synchronizing routine 124 proceeds to step 138.

At step 138, the synchronizing routine 124 requests input (for example, from the operator of the vehicle 10) as to which connected mobile computing device of the multiple connected mobile computing devices shall control the communications and entertainment computing system 30. For example, as illustrated in FIG. 13, the communications and entertainment computing system 30 can cause the user interface 34 to display a query 139, for the operator, as to which mobile computing device then connected to the communications and entertainment computing system 30 shall control the communications and entertainment computing system 30. The communications and entertainment computing system 30 can additionally cause the user interface 34 to display an array of graphical representations 140a-140c for the operator to touch in order to make a selection responding to the query. In the example illustrated, graphical representation 140a represents the primary connection port 32, which is accessible via the first row of seating 18. Thus, the operator would touch graphical representation 140a to select the mobile computing device connected to the primary connection port 32 to control the communications and entertainment computing system 30. Graphical representation 140b represents the connection port 112 disposed at the rear portion 46 of the seating assembly 22 and thus accessible from seat 26 of the second row of seating 20. Thus, the operator would touch graphical representation 140b to select the mobile computing device 114 connected to the connection port 112 to control the communications and entertainment computing system 30. Graphical representation 140c represents a connection port disposed at the rear portion of the other seating assembly 24 and thus accessible from seat 28 of the second row of seating 20. In this example, seating assembly 24 is not supporting a mobile computing device and a mobile computing device is not connected to the communications and entertainment computing system 30 through a connection port disposed on seating assembly 24 accessible by an occupant sitting on seat 28 of the second row of seating 20. Graphical representation 140c can thus be non-selectable. Graphical representation 140c further includes an indicator 142 that the choice is not selectable. The operator makes the choice by touching the desired selectable graphical representation 140a or 140b.

After the operator makes the choice, the synchronizing routine 124 proceeds to step 144. At step 144, the communications and entertainment computing system 30 authorizes the mobile computing device associated with the selected graphical representation 140a-140c to control the communications and entertainment computing system 30. For example, if the operator desires to allow the mobile computing device 114 connected to the connection port 112 located on the rear portion 46 of the seating assembly 22 to control the communications and entertainment computing system 30, then the operator touches graphical representation 140a. The communications and entertainment computing system 30 then grants mobile computing device 114 control over the communications and entertainment computing system 30. The synchronizing routine 124 then proceeds to step 132, ending the synchronizing routine 124.

The method can further including controlling the audio output of the speaker system (such as speaker 36) within the vehicle 10 with the mobile computing device 114. For example, the mobile computing device 114 can stream audio from files located on the mobile computing device 114 or streamed from the Internet, for which audio files the communications and entertainment computing system 30 then causes the speaker system (such as speaker 36) to output. Likewise, the mobile computing device 114 can control functions within the vehicle 10 controllable by the communications and entertainment computing system 30, such as a radio (not illustrated).

In other embodiments, the mobile computing device 114 can control other functions not associated with audio, such as navigation aids. For example, a passenger manipulating the mobile computing device 114 can enter an address into a navigation function of the communications and entertainment computing system 30. The communications and entertainment computing system 30 can then output directions to the address visually for the operator of the vehicle on the user interface 34. In general, the mobile computing device 114, when authorized to control, can control any function available in association with the communications and entertainment computing system 30.

The mobile computing device 114 is supported in place on the seating assembly 22. A passenger sitting in seat 26 behind seating assembly 22 can watch a video on the mobile computing device 114, while the mobile computing device 114 is supported in place. When the passenger desires to exit the vehicle 10 with the mobile computing device 114, the passenger can cause the headrest 42 to move upward from the seatback 40 back toward the raised position 108, which allows the mobile computing device 114 to be removed.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A seating assembly for a vehicle comprising:
   a seatback including a first lower support member attached to a top portion, which is the upper most part of the seatback, the first lower support member including an upward extension that extends away from the top portion; and
   a headrest coupled to the seatback, the headrest including a bottom portion facing the top portion of the seatback and an upper support member disposed at the bottom portion of the headrest, the upper support member including a planar surface and a downward extension that extends generally orthogonally downward from the planar surface and downward away from the bottom portion of the headrest;
   wherein, the first lower support member of the seatback and the upper support member of the headrest are configured to cooperate to support a mobile computing device disposed between the top portion of the seatback and the bottom portion of the headrest.

2. The seating assembly of claim 1,
   the headrest further including a first coupling member extending downward from the bottom portion;
   wherein, the coupling member projects into the seatback.

3. The seating assembly of claim 2,
   wherein, the headrest is adjustable relative to the seatback such that a distance between the top portion of the seatback and the bottom portion of the headrest can be altered by adjusting how far the first coupling member of the headrest projects into the seatback.

4. The seating assembly of claim 2,
   the first lower support member further including an aperture;
   wherein, the first coupling member of the headrest extends through the aperture of the first lower support member.

5. The seating assembly of claim 4,
   wherein, the upward extension of the first lower support member is disposed rearward from the aperture of the first lower support member.

6. The seating assembly of claim 5,
   the seatback further including a second lower support member attached to the top portion of the seatback, the second lower support member also including an upward extension that is parallel to the upward extension of the first lower support member and an aperture; and the headrest further including a second coupling member extending downward from the bottom portion and parallel to the first coupling member;

wherein, the second coupling member extends through the aperture of the second lower support member and projects into the seatback; and wherein, the upward extension of the second lower support member is disposed rearward of the aperture of the second lower support member.

7. The seating assembly of claim 6, wherein, the downward extension of the upper support member is disposed between the first coupling member and the second coupling member.

8. The seating assembly of claim 1:

the seatback further including a second lower support member attached to the top portion of the seatback, the second lower support member also including an upward extension that extends away from the top portion and is parallel to the upward extension of the first lower support member;

both the first lower support member and the second lower support member further include an aperture;

the headrest further including:

a first coupling member that extends downward from the bottom portion, through the aperture of the first lower support member, and into the seatback; and a second coupling member that extends downward from the bottom portion, through the aperture of the second lower support member, and into the seatback;

wherein, the first lower support member of the seatback, the second lower support member of the seatback, and the upper support member of the headrest are configured to support the mobile computing device, which includes a display, disposed between the top portion of the seatback and the bottom portion of the headrest, such that the downward extension of the upper support member, the upward extension of the first lower support member, and the upward extension of the second lower support member support the mobile computing device.

9. The seating assembly of claim 8, the headrest further including a downward extending portion that extends generally orthogonally downward relative to the bottom portion of the headrest;

wherein, the downward extending portion is disposed forward of the mobile computing device and has a width that is wider than a distance between the upward extension of the first lower support member and upward extension of the second lower support member; and wherein, the width of the downward extending portion is wider than a width of the downward extension of the upper support member.

10. The seating assembly of claim 8 further comprising:

a connection port that enables a mobile computer to connect with a communications and entertainment computing system within the vehicle;

wherein, a wire connects the mobile computing device to the connection port.

\* \* \* \* \*